(12) United States Patent
Olk et al.

(10) Patent No.: US 11,024,977 B2
(45) Date of Patent: Jun. 1, 2021

(54) TUNABLE DIELECTRIC METAMATERIAL LENS DEVICE FOR RADAR SENSING

(71) Applicant: IEE INTERNATIONAL ELECTRONICS & ENGINEERING S.A., Echternach (LU)

(72) Inventors: Andreas Olk, Welschbillig (DE); Thiemo Spielmann, Bivange (LU)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 16/612,195

(22) PCT Filed: May 15, 2018

(86) PCT No.: PCT/EP2018/062428
§ 371 (c)(1),
(2) Date: Nov. 8, 2019

(87) PCT Pub. No.: WO2018/210776
PCT Pub. Date: Nov. 22, 2018

(65) Prior Publication Data
US 2020/0412005 A1    Dec. 31, 2020

(30) Foreign Application Priority Data

May 19, 2017   (LU) ..................................... 100258

(51) Int. Cl.
*H01Q 15/00* (2006.01)
*G01S 7/03* (2006.01)
(Continued)

(52) U.S. Cl.
CPC ......... *H01Q 15/0066* (2013.01); *G01S 7/032* (2013.01); *H01Q 3/46* (2013.01);
(Continued)

(58) Field of Classification Search
CPC .. H01Q 15/0066; H01Q 15/0086; H01Q 3/46; G01S 7/032; G01S 13/931; G01S 2007/028
(Continued)

(56) References Cited

U.S. PATENT DOCUMENTS 7,218,285 B2   5/2007  Davis et al.
7,525,711 B1   4/2009  Rule et al.
(Continued)

OTHER PUBLICATIONS

International Search Report corresponding to International application No. PCT/EP/2018/062428, dated Jul. 18, 2018, 4 pages.
(Continued)

*Primary Examiner* — Erin F Heard
*Assistant Examiner* — Michael W Justice
(74) *Attorney, Agent, or Firm* — Reising Ethington P.C.

(57) ABSTRACT

A tunable dielectric metamaterial device for radar sensing comprises at least one metamaterial layer a plurality of electrically conductive electrodes and a plurality of electrically conductive control lines. The metamaterial layer includes a plurality of dielectric resonators comprising tunable material, wherein at least one electromagnetic property of the tunable material varies with an externally controllable electric field applied to it. Two distinct electrically conductive electrodes each are arranged in a spaced manner at any one of the dielectric resonators to cover the dielectric resonator. The electrically conductive control lines are configured for controlling the electric field to be applied to the tunable material, wherein each electrically conductive line is electrically connected to an electrically conductive electrode. For at least two dielectric resonators, the electrically conductive electrodes that are arranged in the same layer to cover the at least two dielectric resonators are distinct from each other.

14 Claims, 10 Drawing Sheets

(51) Int. Cl.
*H01Q 3/46* (2006.01)
*G01S 13/931* (2020.01)
*G01S 7/02* (2006.01)

(52) U.S. Cl.
CPC ........ *H01Q 15/0086* (2013.01); *G01S 13/931* (2013.01); *G01S 2007/028* (2013.01)

(58) Field of Classification Search
USPC .......................................................... 342/175
See application file for complete search history.

(56) References Cited

U.S. PATENT DOCUMENTS

| | | | | |
|---|---|---|---|---|
| 7,692,588 B2 * | 4/2010 | Beer | .................... | H01Q 9/0407 |
| | | | | 343/700 MS |
| 7,864,394 B1 | 7/2011 | Rule et al. | | |
| 8,912,973 B2 * | 12/2014 | Werner | .................. | H01Q 15/02 |
| | | | | 343/853 |
| 2008/0272955 A1 | 11/2008 | Yonak et al. | | |
| 2010/0033389 A1 * | 2/2010 | Yonak | .................... | H01Q 15/08 |
| | | | | 343/755 |
| 2015/0009070 A1 | 1/2015 | Gregoire et al. | | |

OTHER PUBLICATIONS

Written Opinion corresponding to International application No. PCT/EP/2018/062428, dated Jul. 18, 2018, 6 pages.
J. Turpin et al., "Reconfigurable and Tunable Metamaterials: A Review of the Theory and Applications" International Journal of Antennas and Propagation, vol. 2014, Article ID 429837, 19 pages.
C. Pfeiffer et al., "Metamaterial Huygens' Surfaces: Tailoring Wave Fronts with Reflectionless Sheets", Physical Review Letters 110, 197401, dated May 6, 2013.
N. Yu et al., "Flat Optics with Designer Metasurfaces", Nature Materials, vol. 13, pp. 139-150, published Jan. 23, 2014.
I. Staude et al., "Tailoring Directional Scattering through Magnetic and Electric Resonances in Subwavelength Silicon Nanodisks", ACS Nano, vol. 7, No. 9, pp. 7824-7832, published on Aug. 16, 2013.
M. Decker et al., "High-Efficieny Dielectric Huygens' Surfaces", Advanced Optical Materials, pp. 813-820, (2015).
N. Michishita et al., "Dielectric Metamaterial Lens Antenna for Wide Angle Beam Scanning" Wireless Information Technology and Systems (ICWITS), IEEE International Conference on, IEEE, Piscataway, NJ, USA, Aug. 28, 2010, XP031782290, pp. 1-4.

* cited by examiner

TUNABLE DIELECTRIC METAMATERIAL LENS DEVICE FOR RADAR SENSING

TECHNICAL FIELD

The invention relates to a tunable dielectric metamaterial device for radar sensing, particularly for use in automotive applications, and a radar device including such tunable dielectric metamaterial device.

BACKGROUND OF THE INVENTION

It is known in the art to employ radar technology in exterior automotive applications, such as driver assistance systems, for providing improved safety by facilitating an optimized reaction of a driver of a vehicle with appropriate warnings, such as vulnerable road user detection systems, lane change assist systems or blind spot monitoring systems, or even by automatically taking over control of the vehicle, for instance in collision mitigation systems. The most common exterior automotive rated devices operate at radar carrier frequencies in regimes about 24 GHz or about 77 GHz.

In the automotive sector, for example, short range and long range radar systems are typically separated. Short range radar systems such as blind spot monitoring systems or parking aids require an antenna beam that covers a wide solid angle but whose maximum detection range is quite short. In contrast, a long range radar adaptive cruise control (ACC) or pre-crash warning system is designed for detecting in a range of up to 200 m, observing only a very limited solid angle (FIG. 1). By an antenna that enables adjusting the beam width during operation, short range and long range radars could beneficially be combined into one system.

A typical scenario is illustrated in FIG. 1. A vehicle 2 designed as a passenger car uses a radar system that is installed at a front region 4 of the vehicle 2 and that transmits radar waves towards a scene including a roadway 8 with several lanes in a normal driving direction of the vehicle 2. The radar system is configured to detect obstacles or other vehicles 6 of an oncoming and/or a parallel traffic in a detection mode with a short range radar field of view 12, a mid range radar field of view 14 or a long range radar field of view 16.

Reconfigurable antenna systems which are able to modify the beam pattern or beam direction are receiving considerable attention in radar sensing and also in telecommunication. Numerous applications would benefit from a transceiver system with beam properties that can be adapted to needs of an application during operation.

It has been proposed to use reconfigurable and tunable metamaterials from the radar regime through to the optical regime of electromagnetic waves, for instance for modifying a radar system beam pattern or a beam direction. A review of applications is given in the article "*Reconfigurable and Tunable Metamaterials: A Review of the Theory and Applications*" by Jeremiah P. Turpin et al., International Journal of Antennas and Propagation, Volume 2014, Article ID 429837. This documents shall hereby be incorporated by reference in its entirety with effect for the jurisdictions permitting incorporation by reference.

In the article, metamaterials are described to be collections of far-subwavelength (<$\lambda$/10) resonating structures, typically aligned in a regular crystal lattice. They may be characterized as possessing either effective material parameters for bulk, 3D structures, or effective surface impedances for planar, 2D structures. In practice, the term "metamaterial" is applied to any subwavelength resonator, whether in a collection or as an individual structure.

U.S. Pat. No. 7,218,285 B2 describes systems and methods for radiating radar signals, communication signals, or other similar signals. In one embodiment, a system includes a controller that generates a control signal and an antenna coupled to the controller. The antenna includes a first component that generates at least one wave based on the generated control signal and a metamaterial lens positioned at some predefined focal length from the first component. The metamaterial lens directs the generated at least one wave. The term "metamaterial" is defined as a negative-index-of-refraction material. In this way, an antenna can be formed having a relatively small focal length, thereby allowing the antenna to be produced in a smaller overall package than conventional scanning lens antennas without requiring the additional complexity or exhibiting the usual amount of spherical aberrations.

Further, U.S. Pat. No. 7,525,711 B1 describes an actively tunable electromagnetic metamaterial. The tunable electromagnetic metamaterial includes a substrate and an array of split ring resonators formed on the substrate. At least one of the split ring resonators is a capacitively tuned split ring resonator. The capacitively tuned split ring resonator includes a structure having a gap and is formed of an electrically conductive material. The capacitively tuned split ring resonator also includes a region of photo-capacitive material formed in close proximity to the structure such that the capacitance of the metamaterial is changed when illuminated by controlling electromagnetic radiation having a selected range of wavelengths.

U.S. Pat. No. 7,864,394 B1 describes a dynamically variable metamaterial lens and a method of dynamically varying a metamaterial lens. The dynamically variable lens comprises an array of resonance frequency tunable metamaterial cells arranged in two or three dimensions. Each metamaterial cell includes a substrate and a capacitance tuned split ring resonator formed on the substrate, wherein the capacitance tuned split ring resonator includes a structure having a gap and formed of an electrically conductive material and a region of photo-capacitive material formed in close proximity to the structure such that the capacitance of the photo-capacitive material is changed and the resonance frequency of the metamaterial cell is thereby tuned by control illumination of the photo-capacitive material with at the band gap and below the band gap energy.

Moreover, patent application publication US 2010/0033389 A1 describes an automotive radar using a metamaterial lens. The automotive radar comprises an electromagnetic source, such as an antenna, a metamaterial lens, and a reflector. The antenna is located proximate the metamaterial lens, for example supported by the metamaterial lens, and the antenna is operable to generate radiation when the antenna is energized. The reflector is positioned so as to reflect the radiation through the metamaterial lens. The reflector may have a generally concave reflective surface, for example having a parabolic or spherical cross-section. The reflector may be generally dish-shaped, and may have a circular or oval aperture. The metamaterial lens may have an area similar to that of the aperture of the reflector. In some examples, the antenna is located proximate a focal point of the reflector, so that a generally parallel beam is obtained after reflection from the reflector.

The metamaterials have an electromagnetic property that may be dynamically adjusted using a control signal. The control signal may be an electrical control signal, e.g. an AC voltage or a DC voltage, for example using a variable electric field to adjust the permittivity of a tunable element within a metamaterial unit cell. A tunable element may be a varactor diode, or other element providing an electrically tunable capacitance. A tunable element may comprise a tunable material, such as a ferroelectric or phase change material. A tunable material may have a voltage-tunable permittivity, so that the permittivity of the tunable material and hence the electromagnetic parameters (such as resonance frequency) can be adjusted using an electrical control signal. Examples include ferroelectric materials such as barium strontium titanate, and phase change materials such as chalcogenide phase change materials. Other examples of tunable materials are liquid crystal materials or ferromagnetic materials.

In particular, a concept of using Huygens' metasurfaces has been proposed for providing a dynamic reconfigurable antenna. A Huygens' metasurface is a planar array of balanced electric and magnetic polarizable particles (meta-atoms) of subwavelength size.

In the article by Carl Pfeiffer and Anthony Grbic, "*Metamaterial Huygens' Surfaces: Tailoring Wave Fronts with Reflectionless Sheets*", Physical Review Letters 110, 197401 (2013), which shall hereby be incorporated by reference in its entirety with effect for the jurisdictions permitting incorporation by reference, Huygens' metasurfaces are described to be designer surfaces that provide extreme control of electromagnetic wave fronts across electrically thin layers. The balanced electric and magnetic polarizable particles may be arranged periodically as well as non-periodically.

The reflectionless surfaces referred to as metamaterial Huygens' surfaces provide new beam shaping, steering, and focusing capabilities. The metamaterial Huygens' surfaces are realized with two-dimensional arrays of polarizable particles that provide both electric and magnetic polarization currents to generate prescribed wave fronts. A straightforward design methodology is demonstrated in the article and applied to develop a beam-refracting surface and a Gaussian-to-Bessel beam transformer. Metamaterial Huygens' surfaces are said to be able to find a wide range of applications over the entire electromagnetic spectrum including single-surface lenses, polarization controlling devices, stealth technologies, and perfect absorbers.

A Huygens' metasurface may consist of a periodic pattern of resonators that sustain electric and magnetic dipole resonances (Huygens meta-atoms). The response of individual resonators is in most cases controlled by their geometry. If the electric and magnetic dipole resonance are chosen of equal strength, the scattered fields in a backward direction cancel each other out by interference. Consequently, the reflection from the metasurface will be minimized and it may operate efficiently in transmission. A second advantage is that the phase response of those resonators can be varied in a range of $2\pi$, which is mandatory for a functional metasurface design.

Theoretically, Huygens' metasurfaces are able to form wave fronts into almost arbitrary shapes by introducing discontinuous phase shifts, amplitude shifts or polarization shifts. Indeed, phenomena like anomalous beam refraction and lensing have already been experimentally demonstrated, as has been reported in the article by Nanfang Yu and Federico Capasso, "*Flat optics with designer metasurfaces*", Nature Materials Vol 13, pp. 139-150, 2014, which shall hereby be incorporated by reference in its entirety with effect for the jurisdictions permitting incorporation by reference.

A geometry for a Huygens meta-atom that has proven to work efficiently in the infrared and optical frequency range is a simple dielectric cylinder, also often referred to as nano disc, described in the article by Staude et al., "*Tailoring Directional Scattering through Magnetic and Electric Resonances in Subwavelength Silicon Nanodisks*", ACS Nano, Vol. 7, No. 9, pp. 7824-7832, 2013. Basic mode and scattering properties of a metasurface from silicon cylinders have been investigated and reported by the Kivshar group in the article by Decker, M. et al (2015): "*High-Efficieny Dielectric Huygens' Surfaces*", Advanced Optical Materials, 3: 813-820.

SUMMARY

It is therefore an object of the invention to provide a device for radar sensing, in particular for use in automotive applications, that provides tunable beam shaping and/or beam steering in a flexible way during operation of the device.

In one aspect of the present invention, the object is achieved by a tunable dielectric metamaterial device for radar sensing, in particular for use in automotive applications. The metamaterial device comprises at least one metamaterial layer, a plurality of electrically conductive electrodes and a plurality of electrically conductive control lines.

The at least one metamaterial layer includes a plurality of dielectric resonators arranged in parallel. Each dielectric resonator comprises tunable material, wherein at least one electromagnetic property of the tunable material varies with an externally controllable electric field applied to it. The dielectric resonators of the metamaterial layer form meta-atoms of subwavelength size and sustain electric and magnetic dipole resonances. The metamaterial layer in the sense of this aspect of the invention is therefore meant to be a Huygens' metasurface as described before.

Two distinct electrically conductive electrodes of the plurality of electrically conductive electrodes each are arranged at any dielectric resonator of the plurality of dielectric resonators in a spaced manner in a direction perpendicular to the metamaterial layer in at least two different layers to at least partially cover the dielectric resonator in this direction.

The plurality of electrically conductive control lines is configured for controlling the electric field to be applied to the tunable material, wherein each electrically conductive line is electrically connected to an electrically conductive electrode of the plurality of electrically conductive electrodes for controlling the externally controllable electric field.

For at least two dielectric resonators of the plurality of dielectric resonators, the electrically conductive electrodes that are arranged in the same layer to cover the at least two dielectric resonators are distinct from each other.

An advantage of at least some embodiments of the invention lies in that applying electric fields of different strengths to the at least two dielectric resonators is enabled for different tuning of the various dielectric resonators. In a suitable embodiment, this can be used for tuning a radar beam shape or for steering a radar beam. The disclosed tunable dielectric metamaterial device can be used to achieve a reconfigurable antenna system able to modify a beam pattern or a beam direction during operation of the device. A dynamic and local change of transmission properties of the metamaterial layer during operation of the device can be enabled.

The phrases "configured to" and "configured for", as used in this application, shall in particular be understood as being specifically laid out, furnished or arranged.

The term "automotive", as used in this application, shall particularly be understood to encompass an application for a vehicle such as, but not limited to, passenger cars, trucks and buses.

Preferably, the metamaterial layer has a planar shape. A planar design can allow for simple manufacturing.

Manufacturing can also be simplified if the plurality of electrically conductive electrodes is arranged in exactly two different layers such that the electrically conductive electrodes arranged in one of the two layers are coplanar.

In preferred embodiments of the tunable dielectric metamaterial device, at least one electrically conductive electrode of the plurality of electrically conductive electrodes covers a sub-quantity of the plurality of dielectric resonators, wherein the dielectric resonators of the sub-quantity of dielectric resonators are juxtaposed in a direction parallel to the metamaterial layer. The at least one electrically conductive electrode that covers the sub-quantity of dielectric resonators is distinct from the rest of the plurality of electrically conductive electrodes arranged in the same layer.

In this way, in a suitable embodiment a focal length of the metamaterial device can be kept constant in a plane defined by the direction in which the sub-quantity of dielectric resonators is aligned and the direction perpendicular to the metamaterial layer, whereas a focal length of the metamaterial device is tunable in a plane defined by a direction that is perpendicular to the direction of alignment of the sub-quantity of dielectric resonators and the direction perpendicular to the metamaterial layer.

Further, the externally controllable, applied electric field can be homogenized in the tunable material of the sub-quantity of the plurality of dielectric resonators.

In preferred embodiments of the tunable dielectric metamaterial device, in one layer of the at least two different layers, each dielectric resonator of the plurality of dielectric resonators is covered by a different electrically conductive electrode of the plurality of electrically conductive electrodes.

In this way, each dielectric resonator of the plurality of dielectric resonators can be addressed individually in terms of an electric field to be applied to its tunable material. This can enable full freedom with regard to tuning a radar beam shape or to steering a radar beam of a radar device.

Preferably, the dielectric resonators of the plurality of dielectric resonators are equidistantly spaced in at least one direction parallel to the metamaterial layer. Beneficially, an effort for designing the tunable dielectric metamaterial device can be less complex and manufacturing of the metamaterial layer can be simpler. Further, dielectric metamaterial devices with equidistantly spaced dielectric resonators are particularly suitable for certain applications.

These effects are even more pronounced if the dielectric resonators of the plurality of dielectric resonators are arranged to form an array, wherein the dielectric resonators are equidistantly spaced in at least two orthogonal directions that are disposed parallel to the metamaterial layer. For instance, a hexagonal array may be formed by the dielectric resonators of the plurality of dielectric resonators.

Preferably, the dielectric resonators of the plurality of dielectric resonators are arranged to form an array of a size of 10×10 to 50×50 dielectric resonators. In this way, a tunable dielectric metamaterial device with close to optimum performance can be provided. In general, also arrays with unequal numbers of dielectric resonators in the array directions are contemplated within the scope of the invention.

In preferred embodiments of the tunable dielectric metamaterial device, the electrically conductive control lines of the plurality of electrically conductive control lines run outside of any spatial region or spatial volume that is virtually confined by a cross-sectional area of dielectric resonators of the plurality of dielectric resonators in a sectional plane that is aligned parallel to the metamaterial layer, and that extends in a direction perpendicular to the metamaterial layer.

Preferably, the dielectric resonators of the plurality of dielectric resonators have a cross-section, in a sectional plane aligned parallel to the metamaterial layer, which has an elliptical shape. In particular, a circular shape, being a special case of an elliptical shape, shall also be encompassed.

Thus, possible geometries of the dielectric resonators in accordance with the invention include, without being limited to, cylinders with circular or elliptical cross-section, wherein axes of the cylinders are oriented perpendicular to the metamaterial layer, and also spheres and ellipsoids.

In preferred embodiments of the tunable dielectric metamaterial device, the tunable material of the dielectric resonators comprises a ferroelectric material. As is known in the art, ferroelectric materials exhibit a spontaneous electric polarization that can be reversed by applying an electric field. In the case of ferroelectric materials, the electromagnetic property of the tunable material that varies with the externally controllable electric field applied to it is the electrical permittivity of the tunable material. In this way, a sufficiently tunable and economic material for manufacturing of the dielectric resonators can be provided.

Preferably, each of the electrically conductive electrodes of the plurality of electrically conductive electrodes has a sheet resistance lying in a range between 0.5 MΩ/sq and 50 MΩ/sq. In this way, the electrically conductive electrodes are almost transparent for radar waves having a carrier frequency of 76 GHz to 81 GHz, which is most suitable for automotive applications. The disclosed sheet resistance range can provide close to optimum performance of the tunable dielectric metamaterial device, as a lower sheet resistance can result in an insufficiently slow tuning process, and a larger sheet resistance can result in a loss of transparency of the metamaterial layer.

In another aspect of the invention, a radar device is provided. The radar device is particularly useful for automotive applications. The radar device comprises at least one radar chip including at least one antenna member that is configured for transmitting radar waves and at least one antenna member that is configured for receiving radar waves. As will be readily acknowledged by those skilled in the art, the at least one antenna member for transmitting radar waves can be identical to the at least one antenna member for receiving radar waves. The radar device further includes an embodiment of the tunable dielectric metamaterial device as disclosed herein.

The at least one antenna member is configured to transmit the radar waves through the metamaterial layer and the at least one receive antenna member is configured to receive the radar waves through the metamaterial layer. A distance between the antenna members and the metamaterial layer is equal to a minimum focal length of the tunable dielectric metamaterial device within predefined limits. By that, an outgoing radar beam of the radar chip can be collimated and can have a minimum beam width. A reconfigurable antenna system able to modify a radar beam pattern or a radar beam direction during operation can beneficially be provided in this way.

An aperture size of the radar device depends on a beam width of the antenna members and the distance d between the antenna members and the metamaterial layer. In most automotive applications, the distance d will be limited by an integration size of the radar device to roughly 2 cm. A larger aperture, however, has the advantage that a large number of resonators can be used, and a beam shaping resolution increases.

Preferably, the radar device further comprises a closed housing, which surrounds and supports the at least one radar chip and the tunable dielectric metamaterial device. A portion of the closed housing that is facing the at least one antenna member comprises at least one radome layer. Besides the benefits described in context with the tunable electric metamaterial device, a radar device can be provided that is robust against mechanical impact and potential ingress of dirt and/or water with virtually no loss of transmission of the radar waves if the material for the at least one radome layer is suitably chosen. Criteria for selecting of the material can be sufficient mechanical stability, dielectric losses lower than a predetermined threshold, absence of gas bubbles in the material of the at least one radome layer and an achievable surface smoothness.

If the at least one radome layer has at least one curved surface of cylindrical or spherical shape or is formed as a surface of an aspheric lens, the transmitted radar beam can be further optimized by the focusing effect of the at least one radome layer especially for radar devices with a large maximum directivity. As an example for a simple design, the at least one radome layer can have a plano-convex shape.

In preferred embodiments of the radar device, the metamaterial layer and the at least one radome layer are arranged to form a sandwich structure. In this way, a small integration size of the radar device can be accomplished.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DESCRIPTION OF THE ILLUSTRATED EMBODIMENTS

Figure 1:
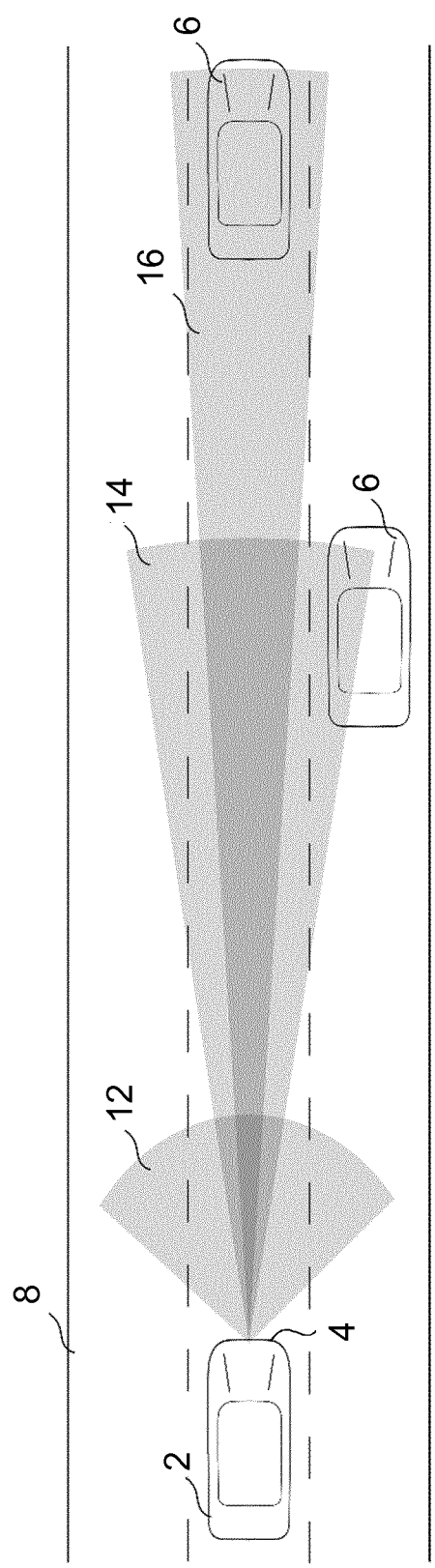
FIG. 1 shows a schematic top view on an automotive traffic scenery including several vehicles, one vehicle being furnished with an automotive radar device in accordance with the invention.
Figure 2:
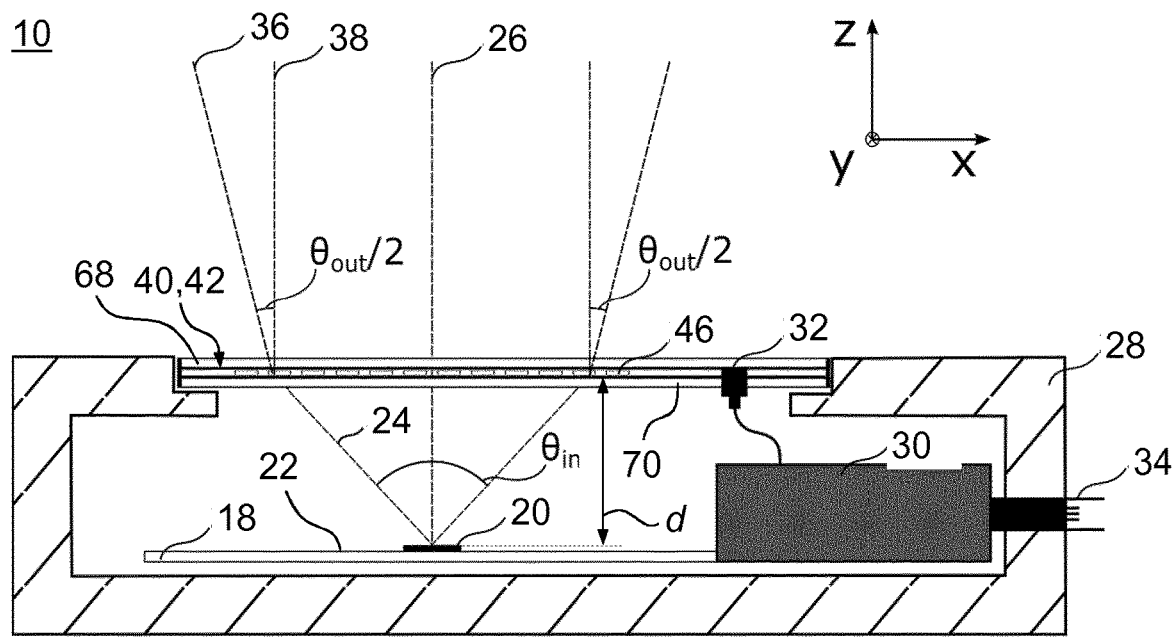
FIG. 2 shows a schematic side view of the radar device pursuant to FIG. 1.

FIG. 2 shows a schematic side view of a radar device 10 in accordance with an embodiment of the invention. The radar device 10 is particularly configured for use in automotive applications and forms part of the radar system that is installed in the front region 4 of the vehicle 2 designed as a passenger car pursuant to FIG. 1.

The radar device 10 comprises a radar chip 18, a tunable dielectric metamaterial device 40, a closed housing 28 and control electronics 30. The closed housing 28 surrounds and supports the radar chip 10 and the tunable dielectric metamaterial device 40. A detailed architecture of the radar chip 10 or of the control electronics 30 is of no importance for this application and will therefore not be described in more detail herein.

An electrical interconnection 32 is provided between the control electronics 30 and the tunable dielectric metamaterial device 40. The control electronics 30 is equipped with a local interconnect network (LIN) interface 34 for data communication with at least one control unit of the vehicle 2.

The radar chip 18 comprises an antenna member 20 that in this specific embodiment is designed as a patch antenna, arranged on an upper surface 22 of the radar chip 18. The antenna member 20 is configured for transmitting radar waves supplied by a transmitter unit (not shown) that resides on the radar chip 18. The transmitter unit is configured to generate radar waves having a carrier frequency lying in the radar band between 76 GHz and 81 GHz. The antenna member 20 is also configured for receiving radar waves and for transmitting the received radar waves to a signal processing unit (not shown) that also resides on the radar chip 18.

The antenna member 20 is configured to transmit the supplied radar waves in a conical beam 24 about a broadside direction 26 that is perpendicularly arranged upwards from the upper surface 22 of the radar chip 18. A portion of the closed housing 28 that is facing the upper surface 22 of the radar chip 18 comprises the tunable dielectric metamaterial device 40 that is arranged between an outer radome layer 68 and an inner radome layer 70 to form a sandwich structure.

Thus, the antenna member 20 is configured to transmit radar waves through the tunable dielectric metamaterial device 40 and to receive radar waves through the tunable dielectric metamaterial device 40. The effect of this will be described hereinafter.

A distance d of 20 mm between the antenna member 20 and the tunable dielectric metamaterial device 40 is equal to a focal length $f_{xz}$ of the tunable dielectric metamaterial device 140 within predefined limits of ±5%.

The tunable dielectric metamaterial device 40 for radar sensing comprises one metamaterial layer 42 that includes a plurality of dielectric resonators 46 serving as Huygens' meta-atoms. The dielectric resonators 46 sustain electric and magnetic dipole resonances.

Figure 3:
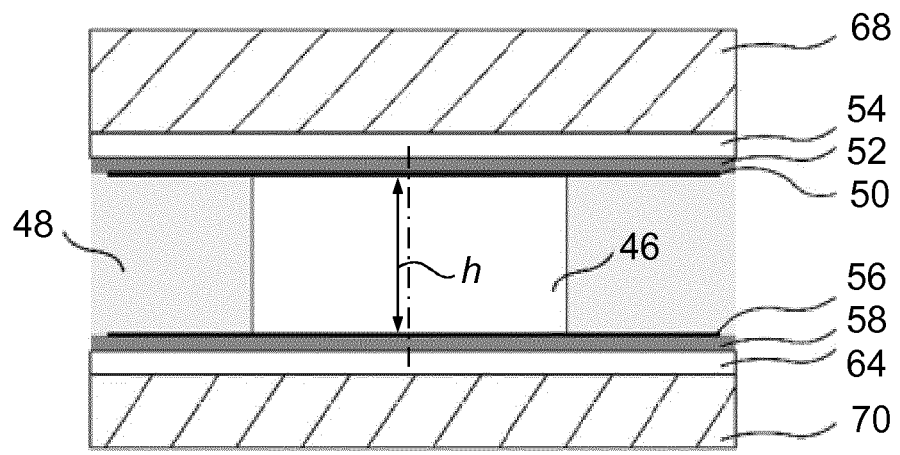
FIG. 3 shows a schematic side view and a partially sectioned, perspective view of a unit cell including a single dielectric resonator of the metamaterial layer of the tunable dielectric metamaterial device of the radar device pursuant to FIG. 2.
Figure 3:
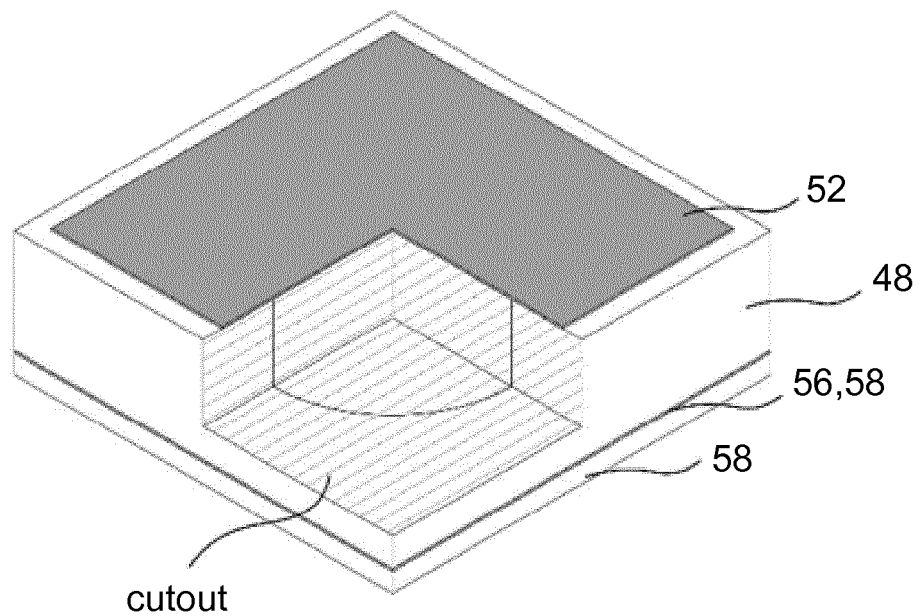

A schematic sectional side view and a partially sectioned, perspective view of a unit cell 44 including a single dielectric resonator 46 of the metamaterial layer 42 of the tunable dielectric metamaterial device 40 of the radar device 10 pursuant to FIG. 2 are given in FIG. 3. In this specific embodiment, the dielectric resonators 46 are shaped as straight cylinders, whose axes are arranged perpendicular to the metamaterial layer 42; i.e. parallel to the broadside direction 26.

The dielectric resonators 46 comprise tunable material in the sense that an electromagnetic property of the tunable material varies with an externally controllable electric field applied to it. In this specific embodiment, the tunable material comprises a ferroelectric material, namely barium strontium titanate ($Ba_{1-x}Sr_xTiO_3$). This material is known in the art for showing chemical stability, high relative electrical permittivity, high tunability and low dielectric losses at radar frequencies. Therefore, the electromagnetic field is almost completely confined within the tunable material of the dielectric resonators 46.

In general, it is also possible to use other tunable materials that appear suitable to those skilled in the art, in particular for specific applications. For instance, the tunable material can include small tunable particles such as ferrites in a polymeric matrix. In other embodiments the tunable material may include phase change materials, liquid crystal material etc.

The tunable dielectric metamaterial device 40 further includes a plurality of electrically conductive electrodes 52, 58. Two distinct electrically conductive electrodes 52, 58 of the plurality of electrically conductive electrodes 52, 58 each are arranged at any dielectric resonator 46 of the plurality of dielectric resonators 46 in a spaced manner in a direction perpendicular to the metamaterial layer 42 in two different layers to cover the dielectric resonator 46 in this direction.

Each unit cell 44 can be thought of as a stack of various layers. On the top of the cylindrical dielectric resonator 46, a top electrode layer including an electrically conductive electrode 52 having a top contact layer 50 to the dielectric resonator 46, and a top substrate 54 are arranged. Below the bottom of the cylindrical dielectric resonator 46, a bottom electrode layer including an electrically conductive electrode 58 having a bottom contact layer 56 to the dielectric resonator 46, and a bottom substrate 64 are arranged. As will be described hereinafter, the electrically conductive electrode 52 of the top electrode layer and the electrically conductive electrode 58 of the bottom electrode layer are each electrically connected to distinct electrically conductive control lines 60 of a plurality of electrically conductive control lines 60 to apply an electric field to the tunable material.

The electrically conductive electrodes 52, 58 of the plurality of electrically conductive electrodes 52, 58 are made from a material that is virtually transparent for radar waves of the radar carrier frequency of operation $f_{op}$. For the considered automotive radar frequency band between 76 GHz and 81 GHz, a thin layer of carbon black is a suitable electrode material. The sheet resistance of the electrically conductive electrodes 52, 58 is selected to lie in a range between 0.5 MΩ/sq and 50 MΩ/sq. In this specific embodiment, a sheet resistance at the low end of the range, namely 0.5 MΩ/sq is chosen.

In order to enable a planar manufacturing process, the space between the cylindrical dielectric resonators 46 is filled with a filling material 48 that is mechanically soft and has adhesive properties. For best performance of the tunable dielectric metamaterial device 40, the filling material 48 should have a relative permittivity $\epsilon_r$ that is as low as possible. A requirement for all dielectrics used in the tunable dielectric metamaterial device 40 is that the electromagnetic losses, represented by the imaginary part of the relative permittivity $\epsilon_r$, are low.

The dielectric resonators 46 can, for instance, be manufactured from a powder pressed in a stamping press and can be cured and/or sintered afterwards, which most conveniently leads to a mechanically robust cylindrical shape.

Also, for reasons of processability and mechanical robustness, it can be meaningful to put the cylindrical dielectric resonators 46 on one of the substrates 54, 64 before pressing the stack.

Height h and radius $r_{cyl}$ of the cylinder have to be chosen in order for the resonance frequency of electric and magnetic dipole modes to match the radar carrier frequency of operation $f_{op}$. An analytical solution for the resonator dimensions is available by $$h = \frac{\lambda}{2\sqrt{\epsilon_r}}$$

$$r_{cyl} = \frac{3.83}{k_r}$$

$$k_r = k_g\sqrt{1 - \frac{1}{\epsilon_r}} = \frac{2\pi\sqrt{\epsilon_r}}{\lambda}\sqrt{1 - \frac{1}{\epsilon_r}}.$$

Herein, λ denotes the free-space wavelength corresponding to the frequency of operation $f_{op}$, $\epsilon_r$ is the relative electrical permittivity at the frequency of operation $f_{op}$, $k_g$ is the radial wavenumber in free space and $k_r$ is the radial wavenumber within a dielectric waveguide. The number 3.83 results from the first non-trivial zero of the Bessel function of the first kind $J_1(k_r r)$.

The equations above are valid for a cylindrical dielectric resonator 46 that is surrounded by air. In the device, the dielectric resonator 46 is surrounded by different other dielectrics, electrodes and contacts (FIG. 3). The exact values for the height h and the radius $r_{cyl}$ may therefore differ from the equations above. More precise values for height h and radius $r_{cyl}$ at which the electric and magnetic mode match can be determined in full wave simulations of a complete unit cell. Alternative geometries for the dielectric resonators 46 that represent effective Huygens meta-atoms are cylinders with ellipsoidal cross section, spheres or ellipsoids.

Figure 4:
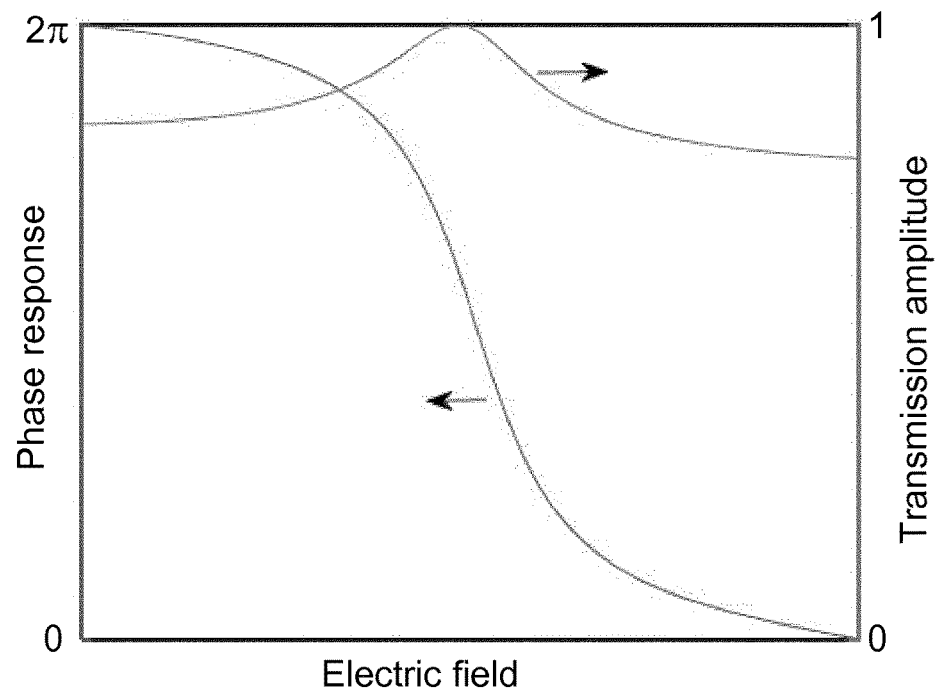
FIG. 4 is a plot showing a typical dependency of a phase response on a control parameter c of the metamaterial layer of the tunable dielectric metamaterial device pursuant to FIG. 3.

If a tuning range, i.e. a possible variation of the relative electrical permittivity $\epsilon_r$ of the tunable material of the dielectric resonator 46 is of the order of 25%, a continuous adjustment of a phase response of a unit cell 44 within a 2π range is enabled by varying the externally controllable applied electric field. A typical function of phase response and an applied electric field is shown in FIG. 4. It is noted that for almost ideal Huygens' meta-atoms the transmission of the radar wave through a unit cell 44 is close to unity, independent of the applied electric field.

Figure 5:
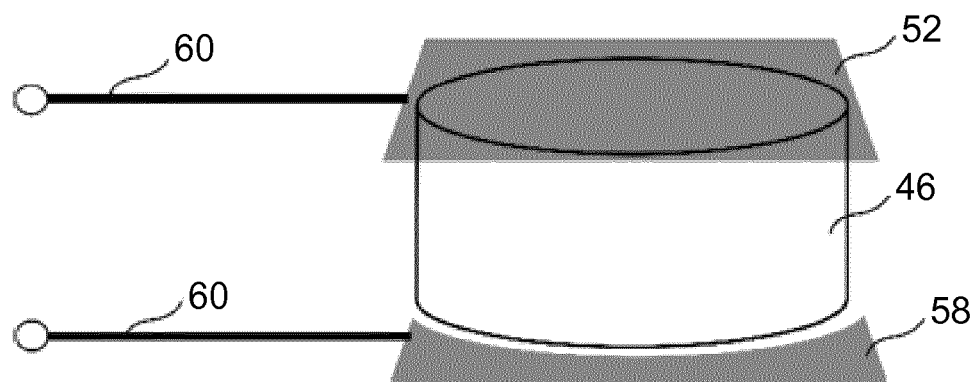
FIG. 5 illustrates an equivalent circuit model of the single dielectric resonator pursuant to FIG. 3, FIGS. 6a and 6b are an illustration of the beam forming effect of the tunable dielectric metamaterial device pursuant to FIG. 7.
Figure 5:
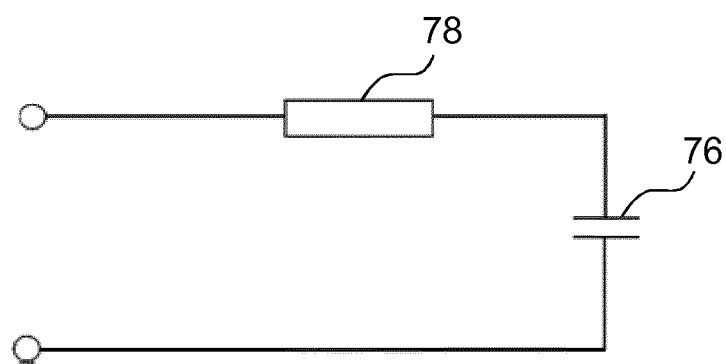

The tuning process can be understood more precisely in an equivalent circuit model of the single dielectric resonator 46 pursuant to FIG. 3, which is illustrated in FIG. 5. The electrically conductive electrodes 52, 58 and the dielectric resonator 46 arranged in between form a capacitor 76 with capacitance C, and the electrically conductive electrode 52, 58 and the respective electrically conductive control line 60 are represented by a resistor 78 having a resistance R. Consequently, the characteristic for tuning a unit cell 44 from a lowest to a highest electric field can be approximated by the time constant $\tau$ of an RC network:

$$\tau = R \cdot C.$$

Herein, the capacitance C of each dielectric resonator 46 is determined by the surface $A = \pi r_{cyl}^2$ and the height h of the cylinder:

$$C = \epsilon_0 \epsilon_r \frac{A}{h}.$$

Considering the requirement for an update rate of a typical automotive radar device, the resulting time constant $\tau$ should be in the order of a few μs or even less, depending on the exact application.

Figure 7:
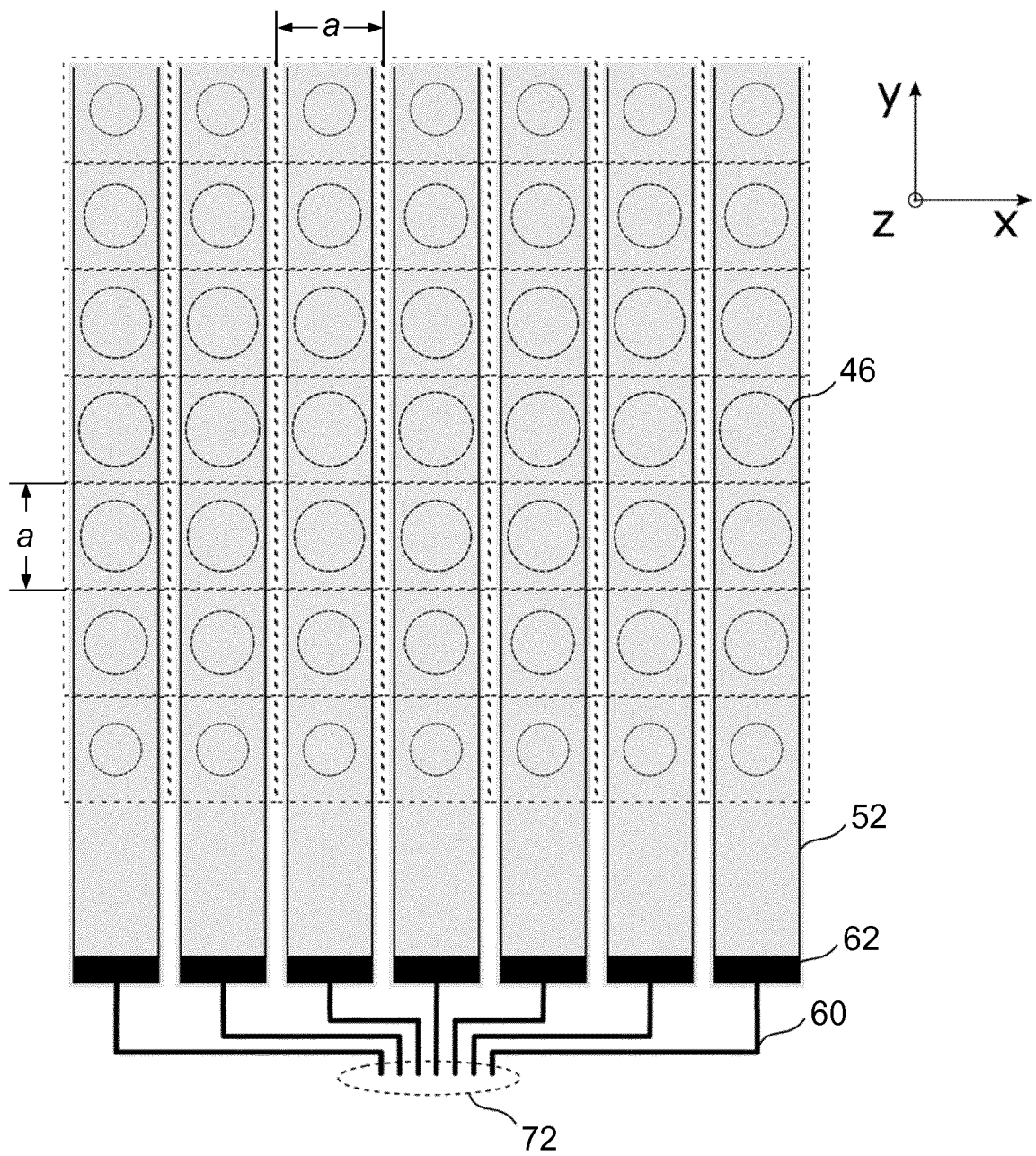
FIG. 7 is a schematic lay-out of the tunable dielectric metamaterial device of the radar device pursuant to FIG. 2 in a top view.

FIG. 7 is a schematic lay-out of the tunable dielectric metamaterial device 40 of the radar device 10 pursuant to FIG. 2 in a top view. A Cartesian coordinate system is indicated for orientation. The tunable dielectric metamaterial device 40 comprises a plurality of 21×21 cylindrical dielectric resonators 46 (indicated by dashed circles) whose axes are aligned in the z-direction, which is arranged perpendicular to the metamaterial layer 42; i.e. parallel to the broadside direction 26. The dielectric resonators 46 of the plurality of dielectric resonators 46 have a cross-section, in a sectional plane aligned parallel to the metamaterial layer 42, that has an elliptical and in particular a circular shape. In FIG. 7, a smaller array of 7×7 dielectric resonators 46 is shown for reasons of simplicity. The dielectric resonators 46 of the plurality of dielectric resonators 46 are equidistantly spaced in the x-direction and in the y-direction with identical spacing a (indicated by dashed gridlines), such that the position of each dielectric resonator 46 can be described by coordinates $(x_i, y_j) = (a \cdot i, a \cdot j)$. In other embodiments, a spacing in the x-direction and a spacing in the y-direction may differ from each other.

The tunable dielectric metamaterial device 40 includes a plurality of seven electrically conductive electrodes 52 arranged in the top electrode layer. As described before, the electrically conductive electrodes 52 are formed by a thin layer of carbon black having a sheet resistance of 0.5 MΩ/sq.

In FIG. 7, seven electrically conductive electrodes 52 of the plurality of eight electrically conductive electrodes 52 are shown to have a rectangular shape and to be aligned parallel to the y-direction. Each one of the seven electrically conductive electrodes 52 covers, in the z-direction, a sub-quantity of seven dielectric resonators 46 of the plurality of dielectric resonators 46, which are juxtaposed in the y-direction. An eighth electrically conductive electrode (not shown) forms a ground plane that is arranged parallel to the xy-plane in the bottom electrode layer, which is spaced from the seven electrically conductive electrodes 52 in the z-direction (not shown in FIG. 7) to completely cover the plurality of dielectric resonators 46 in the z-direction.

Each one of the seven electrically conductive electrodes 52 is distinct from the rest of the plurality of the electrically conductive electrodes 52 arranged in the same layer. By that, a different electric field for tuning purposes can be applied to each sub-quantity of seven dielectric resonators 46 juxtaposed in the y-direction. The purpose of the seven electrically conductive electrodes 52 is to homogenize an applied electric field in the volume of each covered unit cell 44.

The tunable dielectric metamaterial device 40 comprises a plurality of electrically conductive control lines 60, which are configured for controlling the electric field to be applied to the tunable material of the dielectric resonators 46. Each electrically conductive control line 60 is electrically connected via a terminal strip 62 to an electrically conductive electrode 52 of the plurality of electrically conductive electrodes 52 for controlling the externally controllable electric field. The electrically conductive control lines 60 of the plurality of electrically conductive control lines 60 and the corresponding terminal strips 62 are made from a thin sheet of a highly electrically conductive material such as copper ($\sigma = 5.6 \times 10^7$ $(\Omega \cdot m)^{-1}$) or silver ink ($\sigma = 1 \times 10^7 \ldots 10 \times 10^7$ $(\Omega \cdot m)^{-1}$). Manufacturing the electrically conductive electrodes 52 and the electrically conductive control lines 60 from two materials of different electrical conductivity can enable to keep a potential interference with the radar waves propagating through the metamaterial layer 42 sufficiently low, while at the same time the resistance R of the electrically conductive electrodes 52 and the electrically conductive control lines 60 can be kept low enough to achieve a short time constant $\tau$.

It is emphasized that the electrically conductive control lines 60 run outside an aperture of the plurality of dielectric resonators 46 so as not to interfere with any radar waves transmitting through the dielectric resonators 46. Further, in this specific embodiment, it could be meaningful to utilize the antenna member 20 in a way to emit a linearly polarized radar wave such that the electric field of the radar wave is perpendicular to the plurality of electrically conductive electrodes 52. In this perpendicular arrangement, the coupling between radar waves and the plurality of electrically conductive electrodes 52 is relatively low. Outside an aperture field, where a design of the plurality of electrically conductive electrodes 52 and the plurality of electrically conductive control lines 60 does not need to respect radar wave properties, it can be meaningful to bring the electrically conductive control lines 60 closer together in an interconnect zone 72, depending on the connection to a power supply and the control electronics 30.

The electrically conductive electrodes 52 as well as the electrically conductive control lines 60 can be printed directly on the substrates 54, 64 in FIG. 3, for instance by applying a screen printing or inkjet printing process, before performing a step of stacking and pressing the stack with filling material and dielectric resonators 46. Alternatively, a standard printed circuit board etching process can be applied.

For the embodiment of the radar device 10 pursuant to FIGS. 2, 3 and 7, the antenna member 20 on the radar chip 10 has a typical beam width of $\theta_{patch} \sim 60°$. This means, if all voltages $V_i$ applied to each electrically conductive electrode 52 of the plurality of electrically conductive electrodes 52 are turned off (i.e. put to the electric potential of the ground plane) and all dielectric resonators 46 along the x-axis have an equal phase response, the outgoing radar beam width $\theta_{out}$ will not change significantly when propagating through the metamaterial layer 42, i.e. θ$_{out}$~θ$_{patch}$. This configuration could be a meaningful maximum beam width of the overall radar device 10 corresponding to a detection modus using an outgoing radar beam 36 having the short range radar field of view 12 (FIG. 1). With the focal length of the metamaterial layer 42 being set to the distance d from the metamaterial layer 42 to the antenna member 20, i.e. f$_{xz}$=d, the outgoing radar beam 38 will be collimated and therewith will have a minimum beam width. The latter configuration corresponds to a detection modus using the long range radar field of view 16. Here, the desired phase function of the metamaterial layer 42 should be approximately $$\phi_{des}(x) = \frac{\pi}{\lambda f_{xz}} \cdot x^2.$$

This desired phase function $\phi_{des}$ has to be discretized along the aperture by applying the corresponding control voltage V$_{ij}$ to each dielectric resonator 46. For the specific embodiment of the radar device with electrically conductive electrodes 52 in each column being at the same electric potential V$_i$ (FIG. 7), the electric field applied to a particular dielectric resonator 46 does only depend on the column index i:

$$E(x_i, y_i) = \frac{V_i}{h} = E_i.$$

The relation of phase response $\phi_r$ of a single unit cell 44 and the electric field E$_i$ can be determined in full wave simulation and should preferably be validated by transmission measurements. A typical plot of $\phi_r$ against the electric field E$_i$ is shown in FIG. 4.

The phase response $\phi_r$(E) as well as its inverse function $\phi_r^{-1}$ should be known as accurate as possible. Comparison of the desired phase function $\phi_{des}$ and the relation to the controllable electric field yields:

$$\phi_{des}(x_i) + k_i \cdot 2\pi =$$
$$\phi_r(E_i) \Rightarrow V_i = h \cdot \phi_r^{-1}(\phi^{des} + k_i \cdot 2\pi) \Rightarrow V_i = h \cdot \phi_r^{-1}\left(\frac{\pi}{\lambda f_{xz}} a^2 i^2 + k \cdot 2\pi\right).$$

Figure 8:
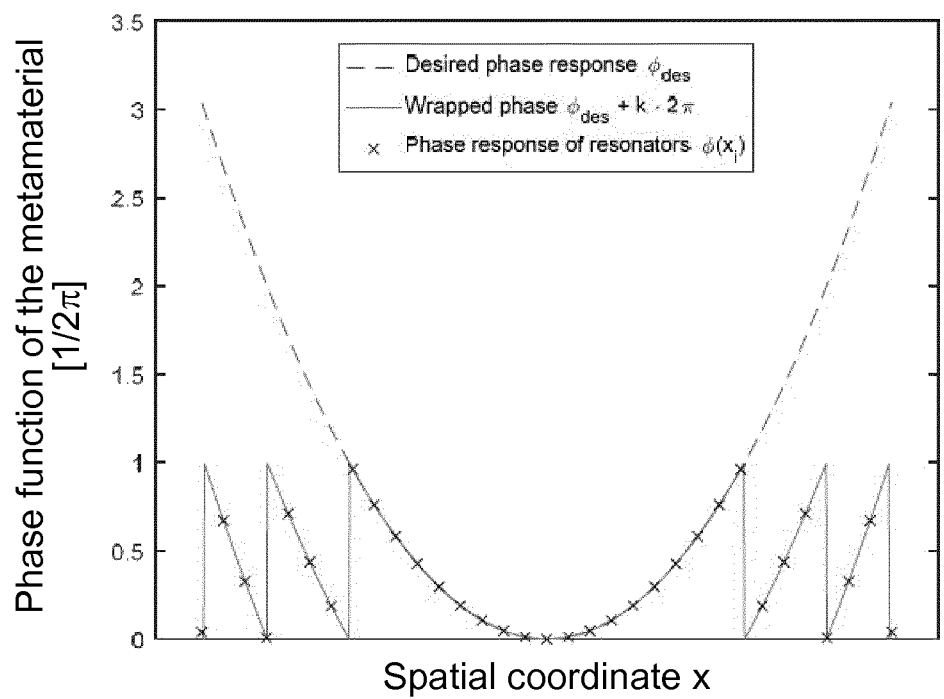
FIG. 8 is a plot of the phase response of the metamaterial layer of the tunable dielectric metamaterial device pursuant to FIG. 7, FIGS. 9a to 9d show a schematic lay-out of an alternative embodiment of the tunable dielectric metamaterial device in accordance with the invention.

Here, k$_i$ is an arbitrary integer (i.e. k$_i$=±1, +2, . . . ) that results from the ambiguity of the phase function. Depending on the desired focal length, the phase function $\phi_{des}$ may reach maximum values of typically $\phi_{des}^{max}$=5π . . . 10π. However, the integer k represents a degree of freedom that can be utilized to ensure that the sum $\phi_{des}$+k$_i$2π lies within a 2π range and a meaningful control voltage V$_i$ for each electrically conductive electrode 52 will be found (FIG. 8).

Figure 6A:
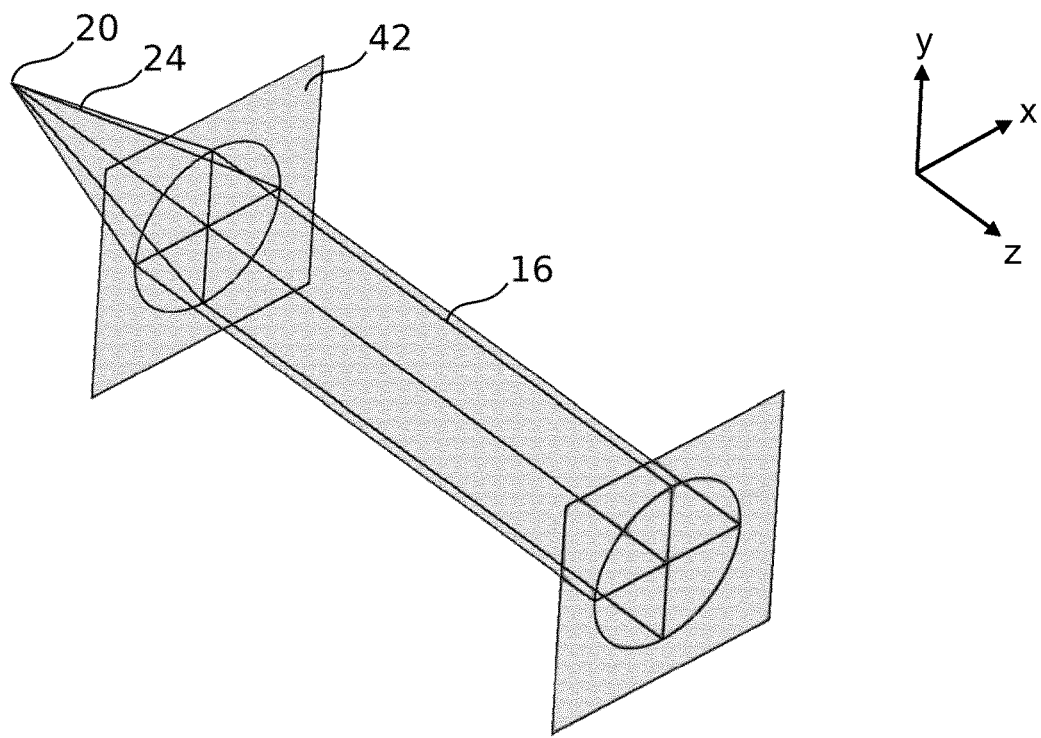
Figure 6B:
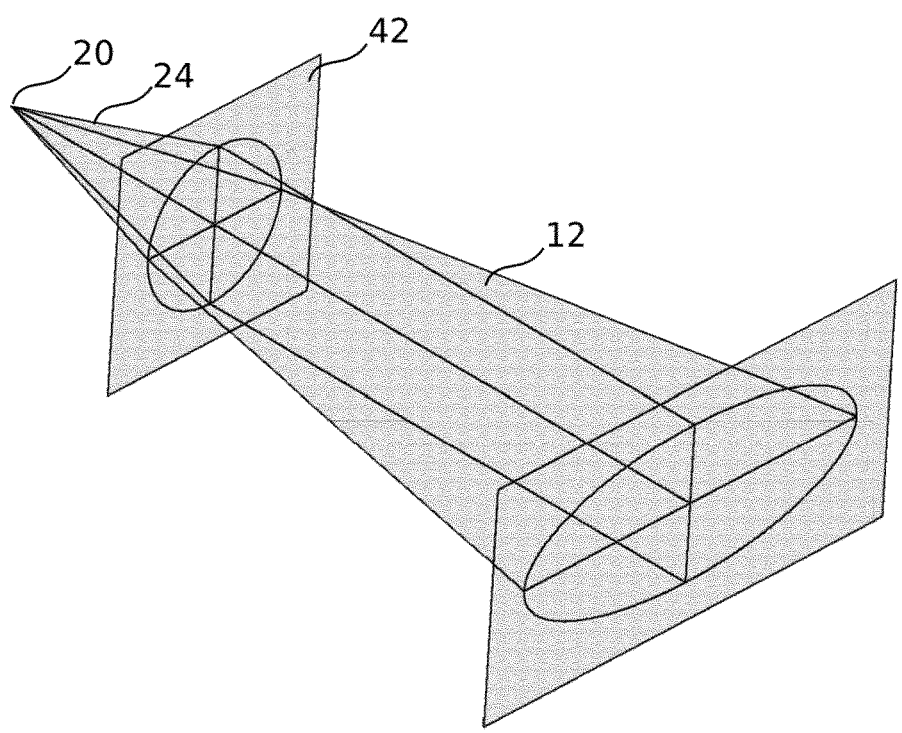

In the specific embodiment of the radar device 10 with electrically conductive electrodes 52 in each column being at the same electric potential V$_i$, the lens effect of the metamaterial layer 42 varies only in the x-axis (FIG. 7). This means that the focal length f$_{xz}$ corresponding to the xz-plane can be tuned and the focal length f$_{yz}$ in the yz-plane remains constant. The lens effect of the tunable dielectric metamaterial device 40 is illustrated in FIGS. 6a and 6b.

In this case, it is sufficient to address all dielectric resonators 46 that are arranged in one line along the y-axis (FIG. 7) with the same bias voltage (i.e. the same applied electric field to the tuning material). However, by varying the geometry among the dielectric resonators 46 arranged along the y-axis, it is still possible to enable a constant but non-zero focal length f$_{yz}$. The limitation only means that the focal length f$_{yz}$ cannot be varied during operation of the radar device 10.

The lay-out parameters of the radar device 10 pursuant to FIG. 2 comprising an embodiment of the tunable dielectric metamaterial device pursuant to FIGS. 3 and 7 are given in Table 1.

TABLE 1

| Radar Device Lay-Out Parameters | |
| --- | --- |
| Beam width of radar chip θ$_{in}$ | 60° |
| Outgoing beam width θ$_{out}$ | ≤60° |
| Aperture diameter d$_{ap}$ | 44 mm |
| Array size N | 21 × 21 resonators |
| Distance metasurface to radar chip d | 20 mm |
| Tuning range of focal length f$_{xz}$ | 20 mm . . . ∞ |
| Frequency of operation f$_{op}$ | 80 GHz |
| Radius of cylindrical resonator r$_{cyl}$ | 0.6 mm |
| Height of cylindrical resonator h | 0.6 mm |
| Lattice constant a | 2.1 mm |
| Permittivity of cylindrical resonator ε$_r$ | 8 . . . 16 |
| Maximum required control voltage V$_i^{max}$ | 250 V |
| Sheet resistance of electrodes | 0.5 MΩ/sq |
| Sheet resistance of control lines | 10 mΩ/sq |

In the following, various possible embodiments of the tunable dielectric metamaterial device in accordance with the invention will be presented. The individual alternative embodiments are identified by a prefix cipher of the particular embodiment, starting with cipher 2. Features whose function is the same or basically the same in all embodiments are identified by reference numbers made up of the prefix cipher of the embodiment to which it relates, followed by the numeral of the feature. If a feature of an embodiment is not described in the corresponding figure depiction, the description of a preceding embodiment should be referred to.

For the sake of brevity only differences between the various embodiments will be described.

Figure 9A:
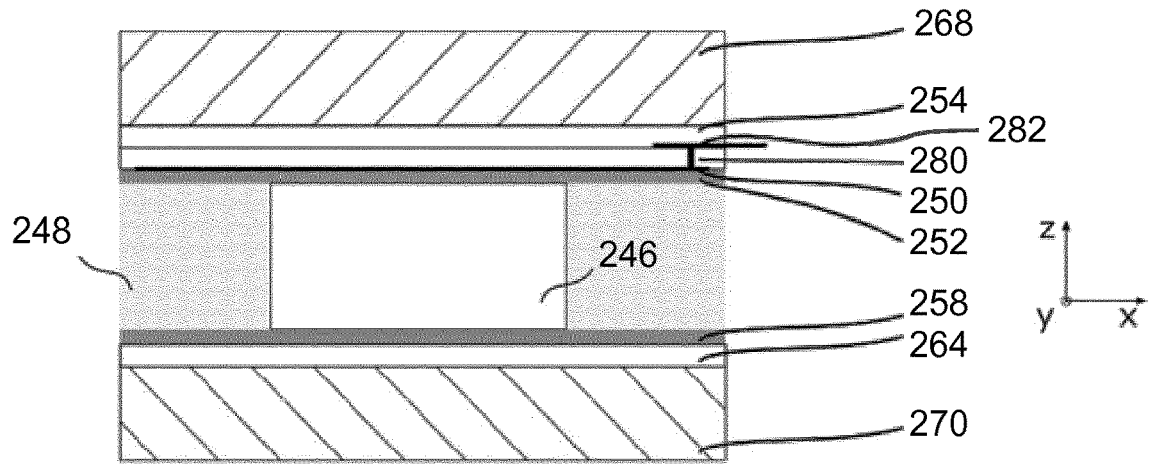

A schematic sectional side view of a unit cell 244 including a single dielectric resonator 246 of the alternative embodiment of the tunable dielectric metamaterial device 240 disclosed herein is shown in FIG. 9a.

Figure 9B:
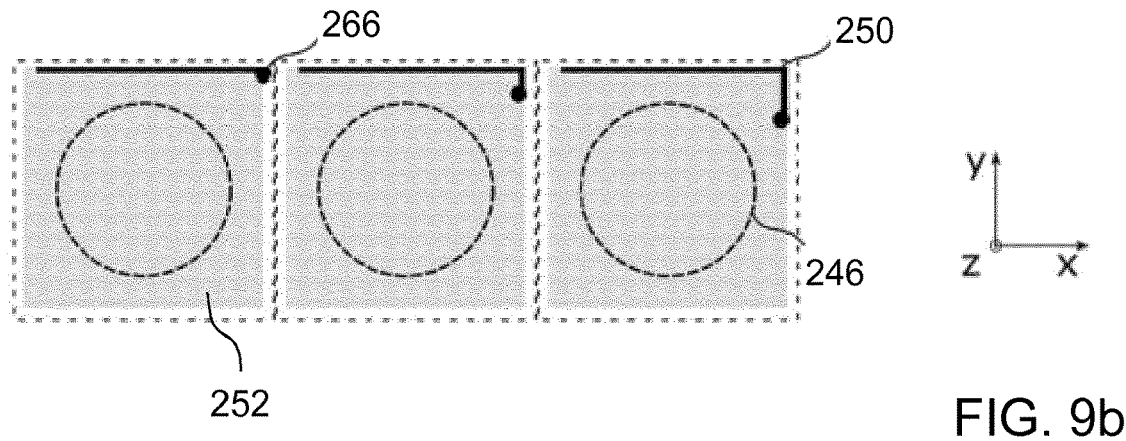
Figure 9C:
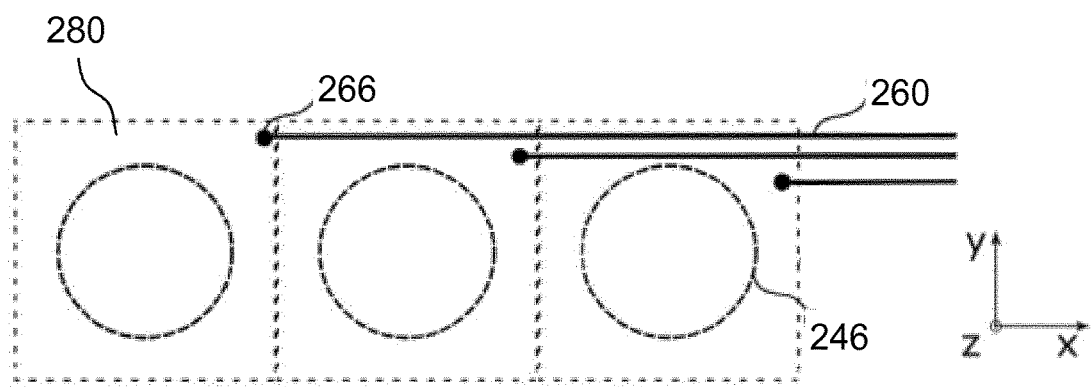
Figure 9D:
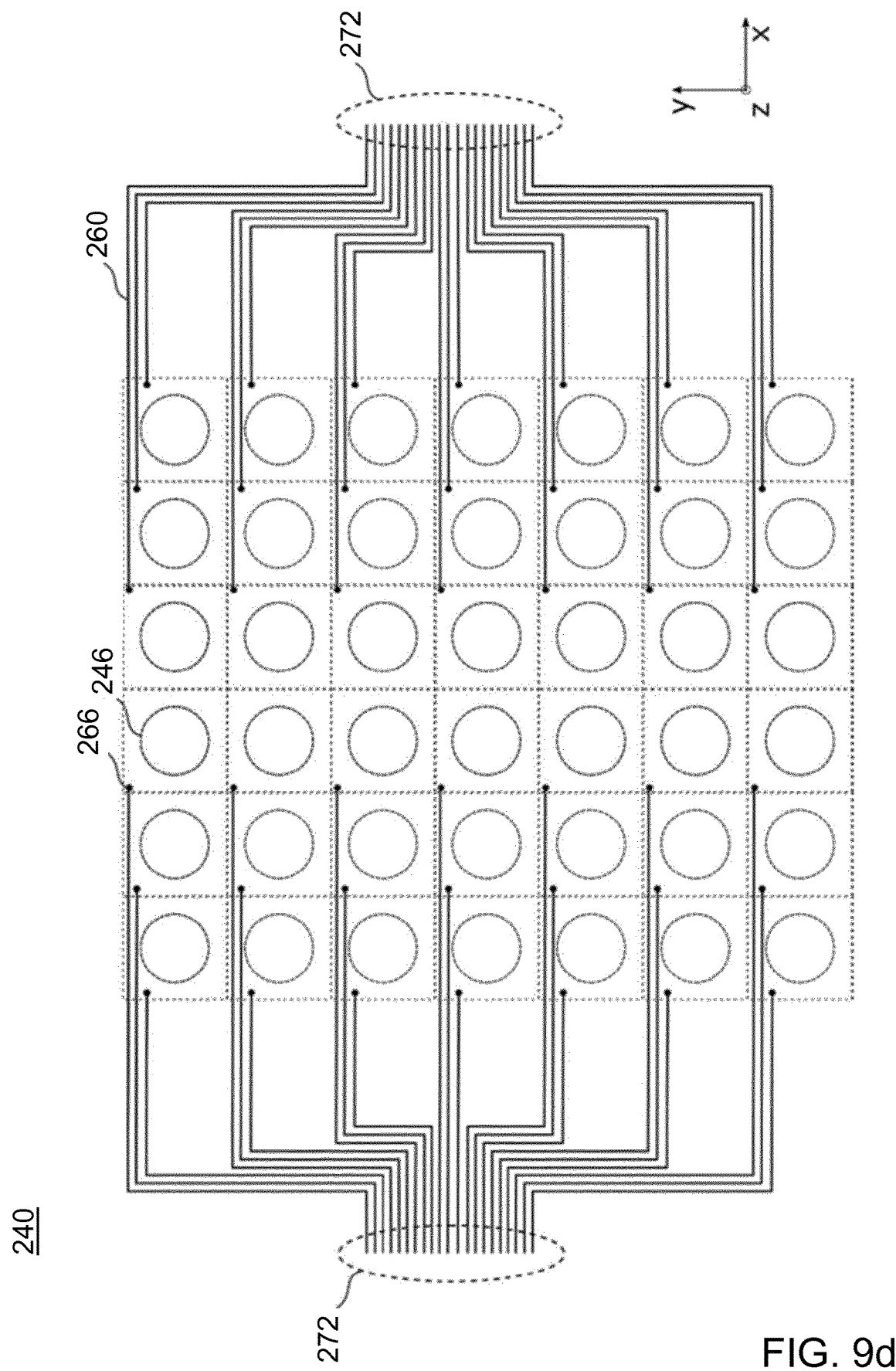

Each unit cell 244 of the alternative embodiment of the tunable dielectric metamaterial device 240 can be thought of as a stack of various layers. On the top of the cylindrical dielectric resonator 246, a top electrode layer including electrically conductive electrodes 252 and a first top contact layer 250, a top intermediate substrate 280, a second top contact layer 282 and a top substrate 254 are arranged. Below the bottom of the cylindrical dielectric resonator 246, a bottom electrode layer including an electrically conductive electrode 258 and a bottom substrate 264 are arranged. Again, the electrically conductive electrode 252 of the top electrode layer and the electrically conductive electrode 258 of the bottom electrode layer are electrically connected to electrically conductive control lines 260 of the plurality of electrically conductive control lines 260 to apply an electric field to the tunable material of the dielectric resonators 246 (FIG. 9d). The electrically conductive control lines 260 are bundled in two interconnect zones 272 arranged at side regions of the top intermediate substrate 280.

Referring again to FIG. 9a, the space between the cylindrical dielectric resonators 246 is filled with the same filling material 248 as in the embodiment pursuant to FIGS. 2, 3 and 7. In contrast to this embodiment, the top intermediate substrate 280 and a second top contact layer 282 are additionally implemented in the alternative embodiment of the tunable dielectric metamaterial device 240. In the top intermediate substrate 280, vias 266 are provided for electrically contacting one of the electrically conductive control lines 260 with an electrically conductive electrode 252 of the top electrode layer (FIGS. 9b and 9c). Each dielectric resonator 246 of the plurality of dielectric resonators 246 is covered by a different electrically conductive electrode 252 of the plurality of electrically conductive electrodes 252. In this way, an externally controllable electric field can individually be applied to the tunable material of each dielectric resonator 246.

The alternative tunable dielectric metamaterial device 240 also comprises a plurality of 21×21 cylindrical dielectric resonators 246 (indicated by dashed circles) whose axes are aligned in the z-direction. In FIG. 9d, a smaller array of 7×6 dielectric resonators 246 is shown for reasons of simplicity.

It is noted that the electrically conductive control lines 260 of the plurality of electrically conductive control lines 260 run outside any virtual spatial region or spatial volume that is confined by a cross-sectional area of dielectric resonators 246 of the plurality of dielectric resonators 246 in a sectional plane that is aligned parallel to the metamaterial layer 242; i.e. parallel to the xy-plane, and that extends in a direction perpendicular to the metamaterial layer 242; i.e. in the z-direction.

The electric field $E_{ij}$ applied to a particular dielectric resonator 246 in this case depends both on column index i and on row index j $$E_{ij} = \frac{V_{ij}}{h}.$$

Therewith, also a phase function with variable focal lengths $f_{xy}$ and $f_{yz}$ can be represented by:

$$\phi_{des}(x_i, y_i) = \frac{\pi}{\lambda}\left(\frac{x_i^2}{f_{xz}} + \frac{y_i^2}{f_{yz}}\right).$$

A resulting control voltage applying a desired electric field $E_{ij}$ to each dielectric resonator 246 can be expressed as $$V_{ij} = h \cdot \phi_r^{-1}\left(\frac{\pi a^2}{\lambda}\left(\frac{i^2}{f_{xz}} + \frac{j^2}{f_{yz}}\right) + k_{ij} \cdot 2\pi\right).$$

Figure 10:
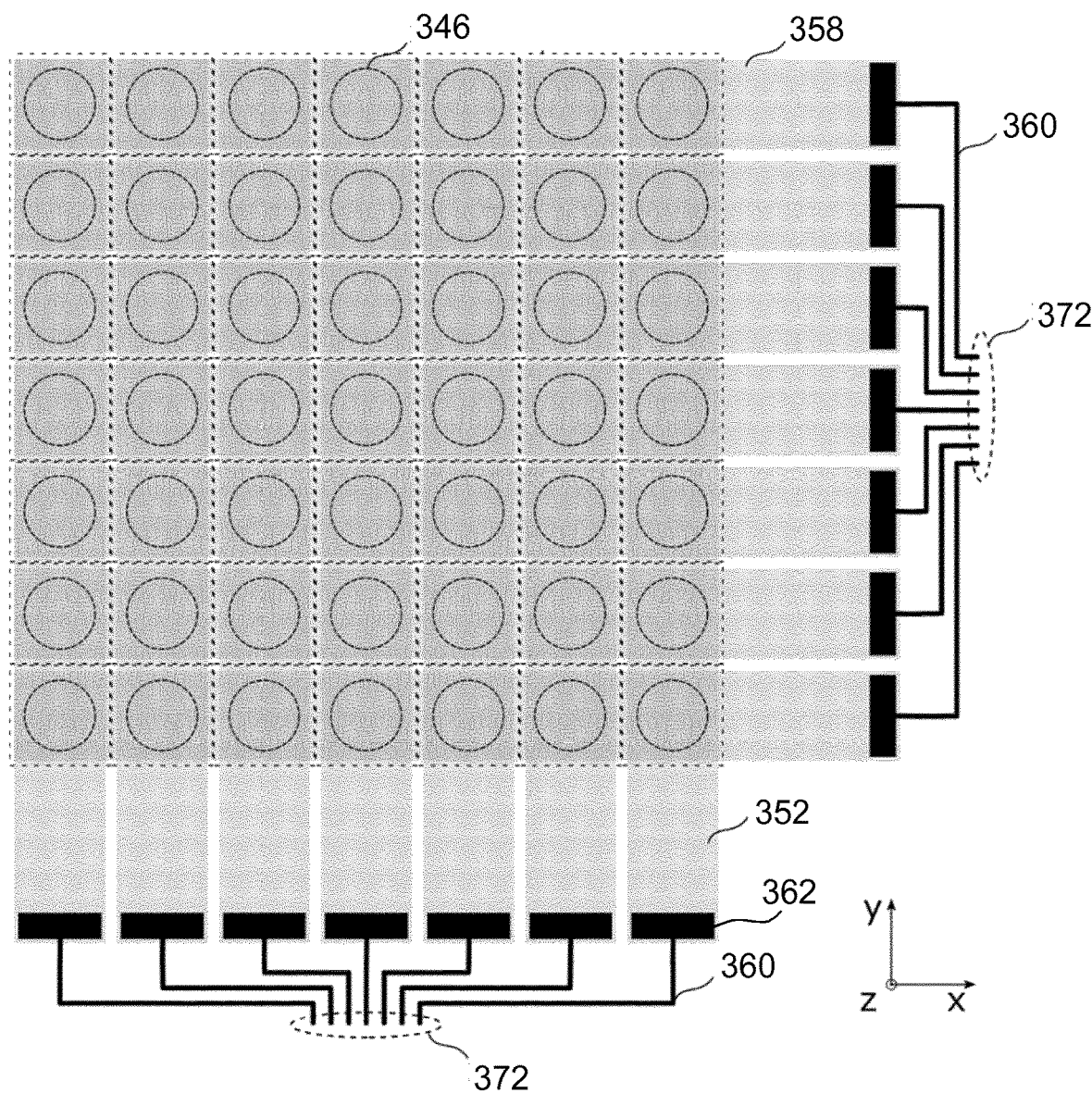
FIG. 10 shows a schematic lay-out of another alternative embodiment of the tunable dielectric metamaterial device in accordance with the invention.

A schematic lay-out of another alternative embodiment of the tunable dielectric metamaterial device 340 in accordance with the invention is illustrated in FIG. 10. In comparison to the embodiment of the tunable dielectric metamaterial device 40 pursuant to FIG. 7, the electrically conductive electrode that forms a ground plane in the bottom electrode layer is replaced by a plurality of seven distinct electrically conductive electrodes 358 that are arranged in the bottom electrode layer. The electrically conductive electrodes 358 of the plurality of seven distinct electrically conductive electrodes 358 have a rectangular shape and are aligned parallel to the x-direction such that each of these electrically conductive electrodes 358 covers, in the z-direction, a sub-quantity of seven dielectric resonators 346 of the plurality of dielectric resonators 346, which are juxtaposed in the x-direction.

By this arrangement, the electrically conductive electrodes 352 of the top electrode layer covering dielectric resonators 346 that are aligned along the y-direction (same column) are put on the same electric potential $V_i$. Vice versa, the electrically conductive electrodes 358 of the bottom electrode layer covering dielectric resonators 346 that are aligned along the x-direction (same row) are put on the same electric potential $V_j$. The electric field $E_{ij}$ that is applied to the tunable material of a particular dielectric resonator 346 is proportional to the difference of the electric potential applied to the top and bottom electrically conductive electrodes 352, 358 covering the particular dielectric resonator 346 in the z-direction:

$$E_{ij} = \frac{\Delta V_{ij}}{h} = \frac{V_i - V_j}{h}.$$

These dependencies represent a certain constraint on the functionality of the radar device. If, for instance, different focal lengths $f_{xy}$ and $f_{xz}$ should be established, the previous equation has to be modified to $$V_i - V_j = h \cdot \phi_r^{-1}\left(\frac{\pi a^2}{\lambda}\left(\frac{i^2}{f_{xz}} + \frac{j^2}{f_{yz}}\right) + k_{ij} \cdot 2\pi\right).$$

Depending on the phase response $\phi_r$, this equation usually does not always have a solution. However, for several meaningful cases it is possible to find the correct electric potentials $V_i$ and $V_j$. This is, for instance, the case if the focal length is sequentially varied in the x-direction and the y-direction, meaning that during a first time period, the focal length $f_{xz}$ can be varied while the focal length $f_{yz}$ is infinitely large, and vice versa in a second, subsequent time period. This mode also allows for an additional phase gradient for beam steering in the x-direction for the first time period and a phase gradient in the y-direction in the second time period.

Further, another meaningful case could be exploited for several radar applications. If the variation of the desired phase function $\phi_{des}$ along each column (or row) is limited to $2\pi$, the factor $k_{ij}$ does not need to wrap the phase response of the corresponding column (or row) unit cells 344. Therefore, $k_{ij}$ would only depend on the row (or column) index j: $k_{ij}=kj$ (or $k_{ij}=k_i$). In this case, the right hand side of the previous equation only contains terms that depend on i or on j, and it is possible to solve the equation for the electric potentials $V_i$ and $V_j$. More concrete, this limitation means that the focal length $f_{xy}$ needs to be larger than a certain threshold value:

$$\frac{\pi a^2 i_m^2}{f_{xz}} \leq 2\pi \Leftrightarrow f_{xz} \geq \frac{a^2 i_{max}^2}{2}.$$

The alternative embodiment of the tunable dielectric metamaterial device 340 pursuant to FIG. 10 has the advantage of a reduced number of electric potentials that have to be provided to the plurality of electrically conductive electrodes 352, 358. In particular, for an N×N dielectric resonator array, a power supply with 2 N instead of $N^2$ channels is sufficient.

Figure 11:
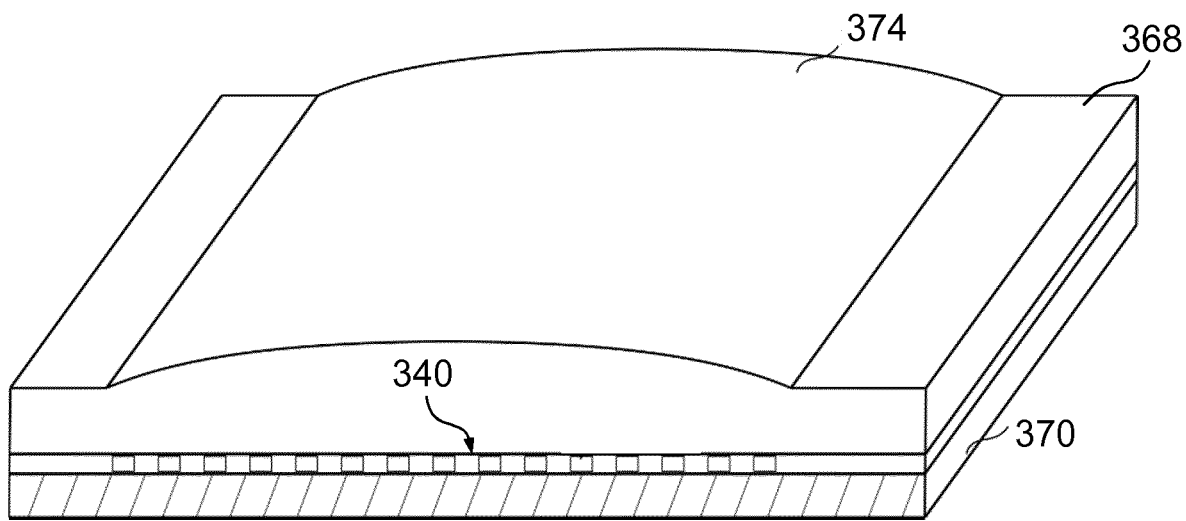
FIG. 11 is a schematic perspective view of the tunable dielectric metamaterial device pursuant to FIG. 10 and an alternative two-layer radome arranged to form part of a sandwich structure.

FIG. 11 is a schematic perspective view of the tunable dielectric metamaterial device 340 pursuant to FIG. 10 and an alternative two-layer radome arranged to form part of a sandwich structure. The tunable dielectric metamaterial device 340 and the alternative two-layer radome are configured for use in the radar device 10 pursuant to FIGS. 2, 3 and 7. The two-layer radome comprises an outer radome layer 368 that is configured to be arranged on a surface of the tunable dielectric metamaterial device 340 that is facing away from the radar chip 18, and an inner radome layer 370 that is configured to be arranged on the surface of the tunable dielectric metamaterial device 340 facing the radar chip 18. Both the outer radome layer 368 and the inner radome layer 370 are completely made from polyethylene terephthalate (PET). The outer radome layer 368 has a curved top surface 374 of cylindrical shape for contributing an additional focusing lens effect in the x-direction, and a flat bottom surface attached to the top surface of the tunable dielectric metamaterial device 340; i.e. the outer radome layer 368 has a cylindrical plano-convex shape. The inner radome layer 370 is shaped as a plane-parallel plate.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A tunable dielectric metamaterial lens device for radar sensing, comprising:
   at least one metamaterial layer including a plurality of dielectric resonators arranged in parallel, each dielectric resonator comprising tunable material, wherein at least one electromagnetic property of the tunable material varies with an externally controllable electric field applied to it,
   a plurality of electrically conductive electrodes, wherein two distinct electrically conductive electrodes of the plurality of electrically conductive electrodes are arranged at any dielectric resonator of the plurality of dielectric resonators, the two distinct electrically conductive electrodes are arranged in a spaced manner in a direction perpendicular to the metamaterial layer in at least two different layers to at least partially cover the dielectric resonator in this direction,
   a plurality of electrically conductive control lines that is configured for controlling the electric field to be applied to the tunable material, wherein each electrically conductive line is electrically connected to an electrically conductive electrode of the plurality of electrically conductive electrodes for controlling the externally controllable electric field,
   wherein for at least two dielectric resonators of the plurality of dielectric resonators the electrically conductive electrodes that are arranged in the same layer to cover the at least two dielectric resonators are distinct from each other.

2. The tunable dielectric metamaterial lens device as claimed in claim 1, wherein at least one electrically conductive electrode of the plurality of electrically conductive electrodes covers a sub-quantity of the plurality of dielectric resonators, and the dielectric resonators of the sub-quantity of dielectric resonators are juxtaposed in a direction parallel to the metamaterial layer, and wherein the at least one electrically conductive electrode that covers the sub-quantity of dielectric resonators is distinct from the rest of the plurality of electrically conductive electrodes arranged in the same layer.

3. The tunable dielectric metamaterial lens device as claimed in claim 1, wherein in one layer of the at least two different layers, each dielectric resonator of the plurality of dielectric resonators is covered by a different electrically conductive electrode of the plurality of electrically conductive electrodes.

4. The tunable dielectric metamaterial lens device as claimed in claim 1, wherein the dielectric resonators of the plurality of dielectric resonators are equidistantly spaced in at least one direction parallel to the metamaterial layer.

5. The tunable dielectric metamaterial lens device as claimed in claim 1, wherein the dielectric resonators of the plurality of dielectric resonators are arranged to form an array, wherein the dielectric resonators are equidistantly spaced in at least two orthogonal directions that are disposed parallel to the metamaterial layer.

6. The tunable dielectric metamaterial lens device as claimed in claim 5, wherein the dielectric resonators of the plurality of dielectric resonators are arranged to form an array of a size of 10×10 to 50×50 dielectric resonators.

7. The tunable dielectric metamaterial lens device as claimed in claim 1, wherein the electrically conductive control lines of the plurality of electrically conductive control lines run outside any spatial region that is virtually confined by a cross-sectional area of dielectric resonators of the plurality of dielectric resonators in a sectional plane that is aligned parallel to the metamaterial layer, and that extends in a direction perpendicular to the metamaterial layer.

8. The tunable dielectric metamaterial device as claimed in claim 1, wherein the dielectric resonators of the plurality of dielectric resonators have a cross-section, in a sectional plane aligned parallel to the metamaterial layer, that has an elliptical shape.

9. The tunable dielectric metamaterial lens device as claimed in claim 1, wherein the tunable material of the dielectric resonators comprises a ferroelectric material.

10. The tunable dielectric metamaterial lens device as claimed in claim 1, wherein each of the electrically conductive electrodes of the plurality of electrically conductive electrodes has a sheet resistance lying in a range between 0.5 MΩ/sq and 50 MΩ/sq.

11. A radar device for use in automotive applications, comprising
   at least one radar chip including at least one transmit antenna member that is configured for transmitting radar waves and at least one receive antenna member that is configured for receiving radar waves,
   a tunable dielectric metamaterial lens device as claimed in claim 1,
   wherein the at least one transmit antenna member is configured to transmit the radar waves through the metamaterial layer and the at least one receive antenna member is configured to receive the radar waves through the metamaterial layer, and wherein a distance between the antenna members and the metamaterial layer is equal to a focal length of the tunable dielectric metamaterial device within predefined limits.

12. The radar device as claimed in claim 11, further comprising a closed housing surrounding and supporting the at least one radar chip and the tunable dielectric metamaterial device, wherein a portion of the closed housing facing the at least one antenna member comprises at least one radome layer.

13. The radar device as claimed in claim 12, wherein the at least one radome layer has at least one curved surface of cylindrical or spherical shape or is formed as a surface of an aspheric lens.

14. The radar device as claimed in claim 12, wherein the tunable dielectric metamaterial lens device and the at least one radome layer are arranged to form a sandwich structure.

* * * * *